United States Patent
Habkost

(10) Patent No.: US 10,776,150 B2
(45) Date of Patent: Sep. 15, 2020

(54) DYNAMICALLY UPDATING VIRTUAL CENTRAL PROCESSING UNITS

(71) Applicant: Red Hat, Inc., Raleigh, NC (US)

(72) Inventor: Eduardo Pereira Habkost, Curitiba (BR)

(73) Assignee: Red Hat, Inc., Raleigh, NC (US)

( * ) Notice: Subject to any disclaimer, the term of this patent is extended or adjusted under 35 U.S.C. 154(b) by 135 days.

(21) Appl. No.: 16/175,584

(22) Filed: Oct. 30, 2018

(65) Prior Publication Data

US 2020/0133704 A1    Apr. 30, 2020

(51) Int. Cl.
- *G06F 9/455* (2018.01)
- *G06F 8/65* (2018.01)
- *G06F 8/656* (2018.01)
- *G06F 9/50* (2006.01)

(52) U.S. Cl.
CPC ............ *G06F 9/45558* (2013.01); *G06F 8/65* (2013.01); *G06F 8/656* (2018.02); *G06F 9/455* (2013.01); *G06F 9/45504* (2013.01); *G06F 9/45508* (2013.01); *G06F 9/45533* (2013.01); *G06F 9/50* (2013.01); *G06F 9/5027* (2013.01)

(58) Field of Classification Search
None
See application file for complete search history.

(56) References Cited

U.S. PATENT DOCUMENTS

| | | | |
|---|---|---|---|
| 8,621,458 B2 | 12/2013 | Traut et al. | |
| 8,819,660 B2 | 8/2014 | Fries et al. | |
| 2012/0030669 A1* | 2/2012 | Tsirkin | G06F 9/46 718/1 |
| 2017/0123831 A1 | 5/2017 | Byard et al. | |

OTHER PUBLICATIONS

Eduardo Habkost "KVM and CPU feature enablement", Developer Conference 2014, downloaded Aug. 3, 2018, 25 pages.

* cited by examiner

*Primary Examiner* — Qing Yuan Wu
(74) *Attorney, Agent, or Firm* — Lowenstein Sandler LLP

(57) ABSTRACT

A method includes receiving, by a hypervisor running on a host computer system, a request pertaining to a microcode update from a guest operating system of a virtual machine running on the host computer system. The method also includes identifying, by a hypervisor, a central processing unit (CPU) model including one or more features associated with the microcode update. The method also includes emulating, by the hypervisor, the CPU model on a virtual central processing unit (vCPU) of the virtual machine to provide access to the one or more features of the CPU model to the guest operating system of the virtual machine.

20 Claims, 6 Drawing Sheets

DYNAMICALLY UPDATING VIRTUAL CENTRAL PROCESSING UNITS

TECHNICAL FIELD

The present disclosure is generally related to virtualization, and is more specifically related to dynamically updating virtual central processing units.

BACKGROUND

Data centers may include clusters consisting of multiple hosts (e.g., physical servers) in racks. Hypervisors may operate on each host to create and run virtual machines (VMs). VMs emulate computer systems and may be referred to as guest machines. The hosts in the clusters may be connected via one or more wired (e.g., Ethernet) and/or wireless (e.g., WiFi) networks (e.g., the Internet, local area network). Each VM running on the hypervisors may include one or more virtual central processing units (vCPUs). A CPU model may include one or more features that are emulated by the hypervisors on the vCPUs of the VMs.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
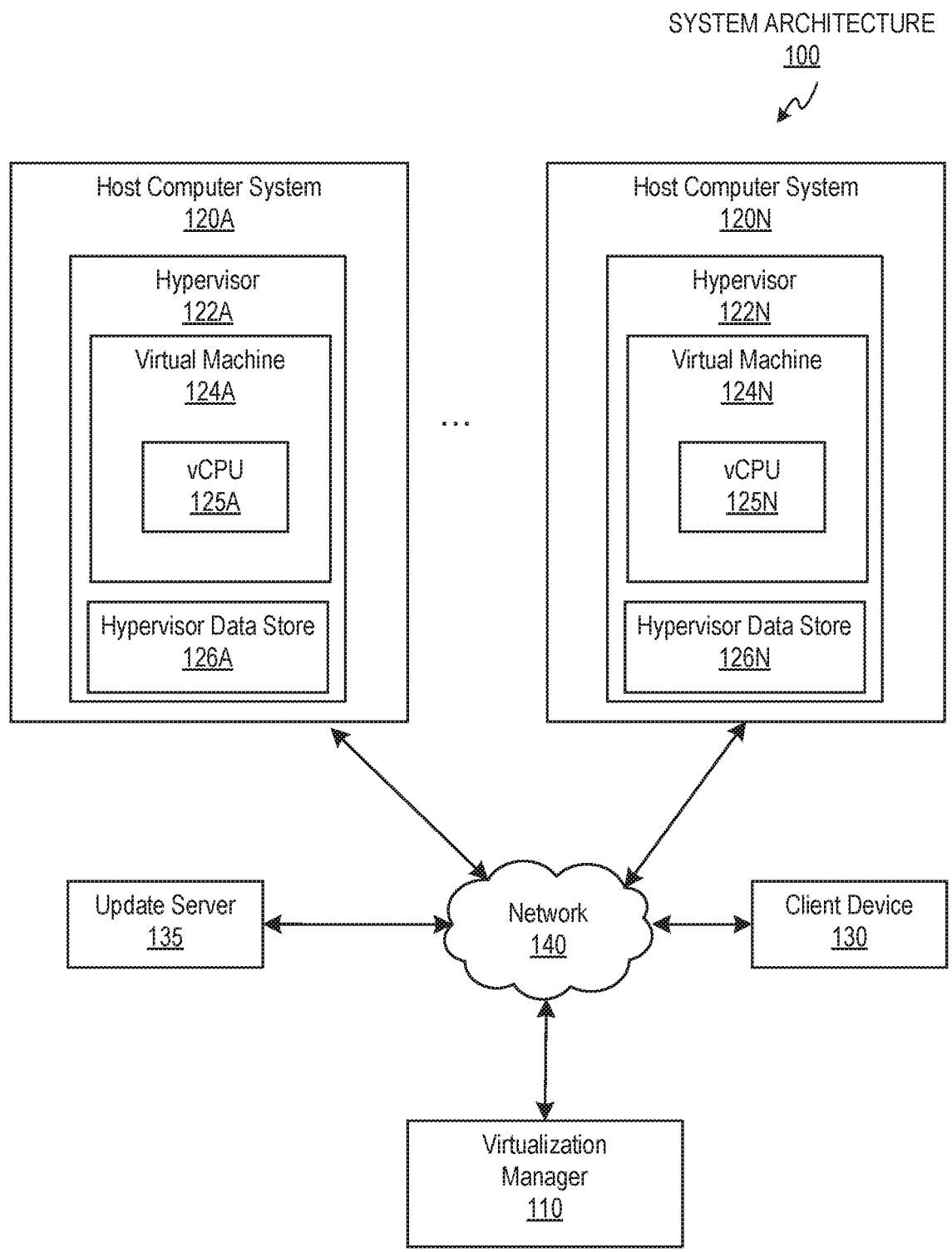
FIG. 1 depicts a high-level diagram of an example system architecture operating in accordance with one or more aspects of the present disclosure.

A virtualization manager may function as a control center for a virtualization environment including one or more host computer systems. The virtualization manager may define hosts, create hypervisors, create virtual machines, manage user permissions, define networks, add storage, configure data centers, and the like, from one central location. The virtualization manager may instantiate one or more hypervisors on one or more host computer systems and instantiate one or more virtual machines to be managed by the one or more hypervisors. During configuration of the virtual machine, a hypervisor may emulate a central processing unit (CPU) model on a virtual central processing unit (vCPU) of a virtual machine. A CPU model may include a definition of one or more features to be provided by the CPU. The one or more features may relate to the instruction set (e.g., 32-bit, 64-bit, etc.), security (e.g., cryptography enabled), performance (e.g., hyper-threading), supported memory, debugging, extensions, page tables, and the like, to be provided by the CPU. The hypervisor may have a policy for which CPU model to emulate for each virtual machine being managed by the hypervisor. The CPU model may be selected based on a type of guest operating system running on the virtual machine, a type of processor to be emulated on the vCPU of the virtual machine, the CPU model including the most current features that are available, or the like. Once the virtual machine is running, a guest operating system running on the virtual machine may execute a CPU identification mechanism (e.g., an instruction) to obtain information related to the features provided by the CPU model being emulated on a vCPU of the virtual machine. The guest operating system may update a guest data store (e.g., a bitmap) stored in guest memory (e.g., random access memory) of the virtual machine with the available features of the CPU model being emulated. The guest operating system may reference the guest data store when accessing the available features of the CPU model.

In some instances, the guest operating system of the virtual machine may be subscribed to one or more channels, such as a channel associated with a software vendor that provides the guest operating system running on the virtual machine or a channel associated with a processor vendor that provides the processor being emulated on the vCPU of the virtual machine. The guest operating system may receive an indication that a microcode update is available from the channel. Microcode may refer to processor firmware. The microcode update may be associated with adding, modifying, or removing one or more features in a corresponding CPU model. The changes to the one or more features included in the microcode update may relate to fixing a bug, fixing a security vulnerability, improving an operation, providing a new operation, or the like for a processor. The guest operating system may request the hypervisor to emulate a certain microcode update. In other instances, an administrator of the virtual machine may request the hypervisor to emulate the certain microcode update. In yet other instances, an administrator of the virtualization manager may request the hypervisor to emulate the microcode update for the virtual machine.

In conventional virtualization environments, adding or removing features of a CPU model being emulated on a vCPU cannot be performed without the hypervisor shutting down the virtual machine. For example, the hypervisor shuts down the virtual machine, selects a new CPU model having different features than the previous CPU model, and restarts the virtual machine so it starts emulating the new CPU model on the vCPU of the virtual machine to provide the new features of the new CPU model to the guest operating system. As may be appreciated, shutting down the virtual machine to change the CPU model being emulated on the vCPU produces undesirable downtime.

Aspects of the present disclosure address the above and other deficiencies by providing technology directed to dynamically updating the vCPU of a virtual machine during runtime. The virtualization manager of the virtualization environment may be subscribed to numerous channels associated with software vendors of the guest operating systems being run by the virtual machines in the virtualization environment. The virtualization manager may also be subscribed to numerous channels associated with processor vendors of the processors being emulated on the vCPUs of the virtual machines in the virtualization environment. The virtualization manager may receive the indication of the microcode update from the one or more channels. The virtualization manager can send a request pertaining to the microcode update to a hypervisor. The request may include a microcode update blob and may identify the microcode update and a corresponding CPU model for the microcode update. A microcode update blob may refer to a collection of binary data. Further, the request can specify adding, updating, or removing an entry to a hypervisor data store maintained by the hypervisor. The hypervisor data store may include fields for an identifier of the microcode update, an identifier of the corresponding CPU model, and an active flag. The hypervisor may also maintain another hypervisor data store that includes mappings of the identifier of CPU models to features provided by the respective CPU models.

Upon receiving the request, the hypervisor may determine the identifier for the microcode update by performing a hash function using the microcode update blob or by using one or more of the bytes of an existing microcode update. In one example, the request from the virtualization manager is to add an entry to the hypervisor data store. Accordingly, the hypervisor may add, to the hypervisor data store, an entry including the identifier of the microcode update and the identifier of the corresponding CPU model for the microcode update. The hypervisor may also set the active flag for the entry to a value indicating the entry is inactive. The hypervisor data store may include multiple different entries for microcode updates and corresponding CPU models for those microcode updates. The microcode updates can include any desirable features in the corresponding CPU models, and as long as the microcode update identifier identified by the request from the guest operating system is found in the hypervisor data store, the guest operating system can request that any desirable microcode update be emulated on a vCPU to have access to the features of a CPU model corresponding to the microcode update.

For example, the guest operating system of the virtual machine may receive an indication of a microcode update from one or more of the channels to which the guest operating system is subscribed. The guest operating system can send a request pertaining to the microcode update to the hypervisor. The request can include a microcode update blob that the hypervisor uses to determine an identifier of the microcode update being requested. The hypervisor may receive the request pertaining to the microcode update from the guest operating system. The hypervisor may identify a CPU model including one or more features associated with the microcode update. For example, the hypervisor may search the hypervisor data store for an entry including the identifier of the microcode update. In response to locating the entry including the identifier of the microcode update, the hypervisor may modify the active flag of the entry to indicate the entry is active. Further, the hypervisor may emulate the CPU model including the one or more features associated with the microcode update on the vCPU of the virtual machine to provide access to the one or more features of the CPU model to the guest operating system of the virtual machine while the virtual machine remains running. The guest operating system may execute the instruction (e.g., a CPUID instruction) to obtain information related to the one or more features of the CPU model associated with the microcode update that is active in the hypervisor data store. The guest operating system may update a guest data store in guest memory to indicate which features are available to the guest operating system. The guest operating system may access the one or more features of the CPU model to perform the microcode update.

As such, the techniques disclosed herein may improve performance of the virtualization environment by dynamically updating features provided via a vCPU to a guest operating system while the virtual machine remains running to reduce downtime of the virtual machine. Further, security and stability may be enhanced by the virtualization manager controlling which microcode updates and corresponding CPU models are added to the hypervisor data store of the hypervisor. If a guest operating system of the a virtual machine requests a microcode update that is not found in the hypervisor data store of the hypervisor, the hypervisor may reject the microcode update request and not change the CPU model being emulated on the vCPU of the virtual machine.

FIG. 1 illustrates an example system architecture 100 in which implementations of the disclosure may operate. The system architecture 100 may include a virtualization manager 110, a plurality of host computer systems 120A-120N, a client device 130, and an update server 135 coupled via a network 140. Although just one client device 130 and one update server 135 are depicted, it should be understood that any suitable number of client devices 130 and update servers 135 may be used according to embodiments described herein. In some embodiments, the host computer systems 120A-120N, the virtualization manager 110, and/or the client device 130 may be included in a virtualization environment. The virtualization environment may be included in a data center.

The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc. Additionally or alternatively, network 140 may include a wired infrastructure (e.g., Ethernet).

The host computer systems 120A-120N may comprise one or more processors communicatively coupled to memory devices and input/output (I/O) devices. The host computer systems 120A-120N may each execute a respective hypervisor 122A-122N. The hypervisors 122A-122N may abstract a physical layer, including central processing units, memory, and I/O devices, and present this abstraction to one or more virtual machines 124A-124N as virtual devices. For example, as depicted, hypervisors 122A-122N may run virtual machines 124A-124N. The virtual machines 124A-124N may execute guest operating systems that may utilize the underlying virtual devices, including virtual central processing units (vCPUS) 125A-125N, virtual memories, and virtual I/O devices.

One or more applications may be running on the virtual machine under the guest operating system. The hypervisors 122A-122N may create, run, manage, and monitor various aspects of virtual machines operation, including the processing, and storage, memory, and network interfaces. In an illustrative example, hypervisors 122A-122N may communicate with the virtualization manager 110 using a Virtual Desktop and Server Management (VDSM) daemon (not shown). The VDSM daemon may include an application programming interface (API) with which the virtualization manager 110 interfaces.

In some embodiments, each hypervisor 122A-122N maintains a hypervisor data store 126A-126N. The hypervisor data store 126A-126N may be a data table, a file, or any suitable data structure. The hypervisor data store may maintain numerous entries each including at least a field for an identifier of a central processing unit (CPU) model, a field for an identifier of a microcode update, and an active flag indicating whether that entry is active or inactive. Each hypervisor 122A-122N may maintain a policy for which CPU model to emulate by default on a vCPU 125A-125N of the virtual machine 124A-124N when the virtual machine is first started. The policy may specify selecting a first CPU model when the guest operating system of the virtual machine 124A has a first type (e.g., Linux®) and selecting a second CPU model when the guest operating system of the virtual machine 124A has a second type (e.g., Windows®). The identifiers of the CPU models may be associated with entries in another hypervisor data store maintained by the hypervisor that maps the various features of the CPU model to the identifier of the CPU model. The hypervisors 122A-122N may emulate the same or different selected CPU models on the vCPU 125A-125N of the virtual machines 124A-124N when starting the virtual machines 124A-124N. Emulating the CPU models on the vCPUs 125A-125N may provide the features of that CPU model associated with the microcode update to the guest operating system of the virtual machine 124A-124N.

The virtualization manager 110 may be hosted by a computer system and include one or more computer programs implemented as computer instructions and executed by the computer system for centralized management of the system architecture 100. In one implementation, the virtualization manager 110 may include various interfaces, including administrative interface, reporting interface, and/or application programming interface (API) to communicate with the client device 130, the host computer systems 120A-120N, and the update server 135 of system architecture 100, as well as to user portals, directory servers, and various other components, which are omitted from FIG. 1 for clarity.

The client device 130 may be any suitable computer system, such as a laptop, desktop, tablet, smartphone, server, or the like. In some embodiments, the client device 130 may be used by an administrator of the virtual machine 124A-124N to initiate downloads of microcode update blobs from the update server 135 and/or request the hypervisor 122A-122N to emulate a certain microcode update. In some embodiments, the client device 130 may be used by an administrator of the virtualization manager 110 to initiate downloads of microcode update blobs from the update server 135 and/or to request to the hypervisor to add an entry for the microcode update to the hypervisor data store.

The update server 135 may be hosted on a computer system (e.g., server) and include one or more programs implemented as computer instructions and executed by the computer system for general distribution of software packages and/or microcode updates. In some embodiments, the update server 135 is maintained by a software vendor that produces operating systems (e.g., Linux®, Windows®, etc.) or is maintained by a processor vendor that produces processors (e.g., Intel®, AMD®, etc.). The update server 135 may provide various software and/or firmware distribution channels that can be subscribed to by other computer systems, applications, and/or services.

For example, the guest operating systems running on the virtual machines 124A-124N may subscribe to a channel of an update server 135 associated with the software vendor that produces that guest operating system and/or subscribe to a channel of an update server 135 associated with the processor vendor that produces the processor being emulated on a respective vCPU 125A-125N. Additionally, the virtualization manager 110 may subscribe to one or more channels of update servers 135 associated with the software vendors that produce the guest operating systems running on the virtual machines 124A-124 in the virtualization environment and/or the processor vendors that produce the processors being emulated by the hypervisors 122A-122N on the vCPUs 125A-125N.

The update servers 135 may send, via the channels, indications of microcode updates to subscribers when the microcode updates are available. The indication may include a microcode update blob that can be used to determine an identifier of the microcode update and a corresponding CPU model including one or more features of the microcode update. Accordingly, the subscribers (e.g., guest operating system of the virtual machines 124A-124N, virtualization manager 110) may receive the microcode update via automatic distribution. In some embodiments, an administrator of the virtualization manager 110 and/or an administrator of the guest virtual machines 124A-124N may request to manually download the microcode updates from the update servers 135.

In some embodiments, responsive to receiving the microcode update blob, the virtualization manager 110 may send a request to a hypervisor 122A to update the hypervisor data store 126A. The virtualization manager 110 may request the hypervisor 122A add, update, or remove an entry from the hypervisor data store 126A. The request may pertain to the microcode update and identify the microcode update and a corresponding CPU model for the microcode update. In some embodiments, the request includes the microcode update blob. The hypervisor 122A may determine the identifier of the microcode update by performing a hash function on the microcode update blob or selecting one or more bytes of an existing microcode update. If the request is to add an entry, the hypervisor 122A may add an entry to the hypervisor data store 126A that includes an identifier of the microcode update, an identifier of the corresponding CPU model for the microcode update, and an active flag set to a value indicating the entry is inactive.

There may be multiple entries including different CPU model identifiers associated with one or more differing features for a microcode update that a guest operating system can request be emulated by the hypervisor 122A. It should be understood that just one entry in the hypervisor data store 126A can include an active flag set to active for a particular CPU model being emulated on a vCPU 125A of the virtual machine 124A. That is, the hypervisor 122A may just emulate one CPU model on the vCPU 125A at a time. In some embodiments, the hypervisor 122A may emulate different CPU models on different vCPUs associated with a single virtual machine 124A.

In some embodiments, when the guest operating system of the virtual machine 124A, receives the microcode update blob, the guest operating system may send a request pertaining to the microcode update to the hypervisor 122A. The request may include an identifier of the microcode update blob that is determined by the hypervisor 122A. After the hypervisor 122A determines the identifier of the microcode update, the hypervisor 122A may discard the microcode update blob. The identifier of the microcode update may be associated with one or more features of a CPU model to be emulated by the hypervisor 122A on the vCPU 125A of the virtual machine 124A.

The hypervisor 122A may identify the CPU model including the one or more features associated with the microcode update by searching the hypervisor data store 126A for an entry including the identifier of the microcode update. If the hypervisor 122A does not find an entry having a matching identifier for the microcode update, the hypervisor 122A may reject the request and not change the current CPU model being emulated on the vCPU 125A. If the hypervisor 122A finds an entry having a matching identifier of the microcode update, the hypervisor 122A may modify the active flag for that entry to a value indicating the entry is active and may modify the active flag for another entry that was active prior to receiving the request to a value indicating the another entry is inactive. This may effectively change the mapping of the CPU models that are emulated on the vCPU 125A for the virtual machine 124A. The hypervisor 122A may emulate the CPU model having the identifier associated with the matching identifier of the microcode update on the vCPU 125A of the virtual machine 124A to provide access to the one or more features of the CPU model to the guest operating system of the virtual machine 124A while the virtual machine 124A remains running. As a result, downtime of the virtual machine 124A is reduced when modifying features of the vCPU 125A of the virtual machine 124A.

In some embodiments, the microcode update blob can be used by the hypervisor 122A to configure the physical CPU hardware of the host computer system 120A with the CPU features corresponding to the microcode update. For example, the virtualization data structures used by the physical CPU may be reconfigured so new features become available to the guest operating system. In some embodiments, the hypervisor 122A may not configure the physical CPU hardware with the microcode update, as some features can be completely emulated by the hypervisor 122A even if they are not supported by the physical CPU hardware of the host computer system 120A on which the vCPU 125A of the virtual machine 124A is running.

In some embodiments, the guest operating system of the virtual machine 124A may execute an instruction to obtain information related to the one or more features provided by the new CPU model being emulated on the vCPU 125A. The guest operating system may update a guest data store (e.g., feature bitmap) stored in guest memory with the available one or more features that can be accessed by the guest operating system.

In some embodiments, the virtualization manager 110 may send a request the hypervisor 122A, and the request may pertain to which entry in the hypervisor data store 126A includes an active flag set to active. The hypervisor 122A may query the hypervisor data store 126A to identify the entry having the active flag set to active and may send at least one of an identifier of the microcode update or an identifier of the CPU model associated with the entry that includes the active flag set to active to the virtualization manager 110. The virtualization manager 110 may send a notification to the client device 130 of the administrator of the virtual machine 124A to notify the administrator that the vCPU 125A of the virtual machine 124A is already emulating a CPU model that is more current than the microcode update requested by the guest operating system.

Figure 2:
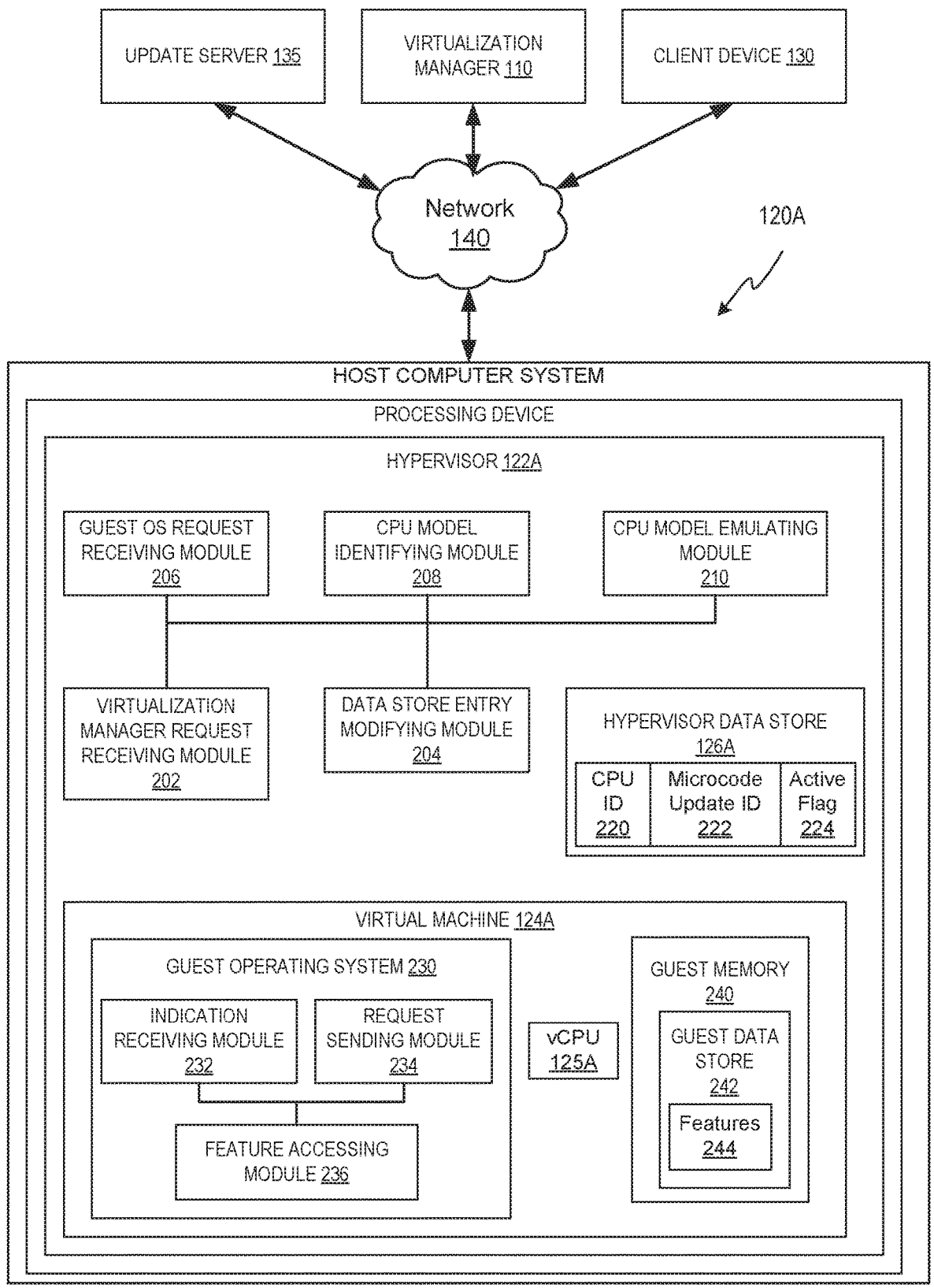
FIG. 2 depicts a block diagram of an example host computer system, in accordance with one or more aspects of the present disclosure.

FIG. 2 depicts a block diagram of an example host computer system 120A, in accordance with one or more aspects of the present disclosure. Host computer system 120A may include one or more processing devices and one or more memory devices. In the example shown, host computer system 120A may include a hypervisor 122A being executed by a processing device. The hypervisor 122A may include a virtualization manager request receiving module 202, a data store entry modifying module 204, a guest operating system (OS) request receiving module 206, a CPU model identifying module 208, and a CPU model emulating module 210. The hypervisor 122A also includes a hypervisor data store 126A. The hypervisor data store 126A may include numerous entries each having a CPU model identifier 220, a microcode update identifier 222, and an active flag 224.

Further, the hypervisor 122A may be running the virtual machine 124A. The virtual machine 124A may be executing guest operating system 230. The guest operating system 230 may include an indication receiving module 232, a request sending module 234, and a feature accessing module 236. Further, the virtual machine 124A may include the vCPU 125A and a guest memory 240. The guest memory 240 may be volatile memory (e.g., random access memory) and may store a guest data store 242. The guest data store 242 may be a file, data table, bitmap, or any suitable data structure. The guest data store 242 may store one or more features 244 that are available from the CPU model currently being emulated by the vCPU 125A.

Also, as depicted, computer system 300 may be communicatively coupled to the virtualization manager 110, the client device 130, and the update server 135 via the network 140. As described herein, the hypervisor 122A may update the CPU model that is being emulated on the vCPU 125A of the virtual machine 124A to provide various features associated with a microcode update to the guest operating system while the virtual machine 124A remains running.

Referring now to the modules of the hypervisor 122A, the virtualization manager request receiving module 202 may receive a request pertaining to a microcode update from the virtualization manager 110. The request may identify the microcode update and a corresponding CPU model for the microcode update. In some embodiments, the request may include a microcode update blob that the hypervisor 122A uses to determine the identifier 222 of the microcode update. After determining the identifier 222 of the microcode update, the hypervisor 122A may discard the microcode update blob. The virtualization manager 110 may have obtained the microcode update blob from the update server 135.

The data store entry modifying module 204 may add, remove, or update the hypervisor data store 126A based on the request from the virtualization manager 110. The request may specify adding, removing, or updating an entry having the microcode update identifier 222 in the hypervisor data store 126A. It should understood that the data store entry modifying module 204 may be prevented from removing or updating an entry in the hypervisor data store 126A that has the active flag 224 set to active. In some embodiments, the request may specify adding an entry to the hypervisor data store 126A with the microcode update identifier 222, an identifier 220 of the corresponding CPU model, and the active flag 224 set to inactive. In some embodiments, the request may specify removing or updating an entry in the hypervisor data store 126A with the microcode update identifier 222. For example, the identifier 220 of the corresponding CPU model for a microcode identifier 222 may be changed so that the microcode update identifier 222 is associated with a different CPU model having different features.

Guest OS request receiving module 206 may receive a request pertaining to the microcode update from the guest operating system 230. For example, the request may be to emulate the microcode update on the vCPU 125A of the virtual machine 124A. The request from the guest operating system 230 may include a microcode update blob.

CPU model identifying module 208 may identify a CPU model including one or more features associated with the microcode update. The identifier 222 of the microcode update may be determined by performing a hash function on the microcode update blob received from the guest operating system 230. A search of the hypervisor data store 126A may be performed for an entry having the microcode update identifier 222. If a matching microcode update identifier 222 is found in the hypervisor data store 126A, the CPU model identifying module 208 may identify the CPU model including one or more features associated with the microcode update by obtaining the features from another hypervisor data store using the identifier 220 of the CPU model associated with the microcode update identifier 222. If a matching microcode update identifier 222 is not found, the request to emulate a microcode update may be rejected and the CPU model currently emulated on the vCPU 125A may not be changed.

Thus, just the microcode updates and associated CPU models requested to be added to the hypervisor data store 126A by the virtualization manager 110 may be allowed to be emulated on the vCPU 125A of the virtual machine 124A in the virtualization environment. As a result, security and stability of the virtual machine 124A and virtualization environment may be improved by the virtualization manager 110 controlling which microcode updates and corresponding CPU models may be emulated on vCPUs.

CPU model emulating module 210 may emulate the CPU model that is identified on the vCPU 125A of the virtual machine 124A to provide access to the one or more features of the CPU model to the guest operating system 230 of the virtual machine 124A. In some embodiments, the CPU model emulating module 210 may emulate the CPU model on the vCPU 125A while the virtual machine 125A remains running. The CPU model emulating module 210 may emulate the CPU model by setting the active flag 224 to active for the entry including the matching identifier 222 of the microcode update. Further, the CPU model emulating module 210 may set the active flag 224 of another entry to inactive that was previously set to active prior to the guest OS request receiving module 206 receiving the microcode update request.

Referring now to the modules of the guest operating system 230 of the virtual machine 124A, the indication receiving module 232 may receive an indication of a microcode update. The indication may be received from the update server 135 or downloaded from any suitable source. The indication may include a microcode update blob and may identify a microcode update and a corresponding CPU model for the microcode update.

Request sending module 234 may send a request pertaining to the microcode update to the hypervisor 122A (e.g., guest OS request receiving module 206). As discussed above, the request sent may include the microcode update blob and include an identifier 222 of the microcode update that may be determined by the hypervisor 122A. The identifier may be associated with a feature of a CPU model to be emulated by the hypervisor 122A on the vCPU 125A of the virtual machine 124A.

Feature accessing module 236 may access the feature of the CPU model to perform the microcode update. The feature may be provided by the vCPU 125A after the hypervisor emulates the CPU model on the vCPU 125A of the virtual machine 124A. The feature accessing module 236 may execute an instruction to obtain information related to the feature of the CPU model being emulated on the vCPU 125A. The information may be used to update a guest data store 242 with the feature 244 that is provided by the vCPU 125 emulating the CPU model. The guest data store 242 may indicate which features 244 are available for the CPU model being emulated on the vCPU 125A. The guest data store 242 may reside in guest memory 240. The guest data store 242 may be a bitmap, file, or any suitable data structure.

Figure 3:
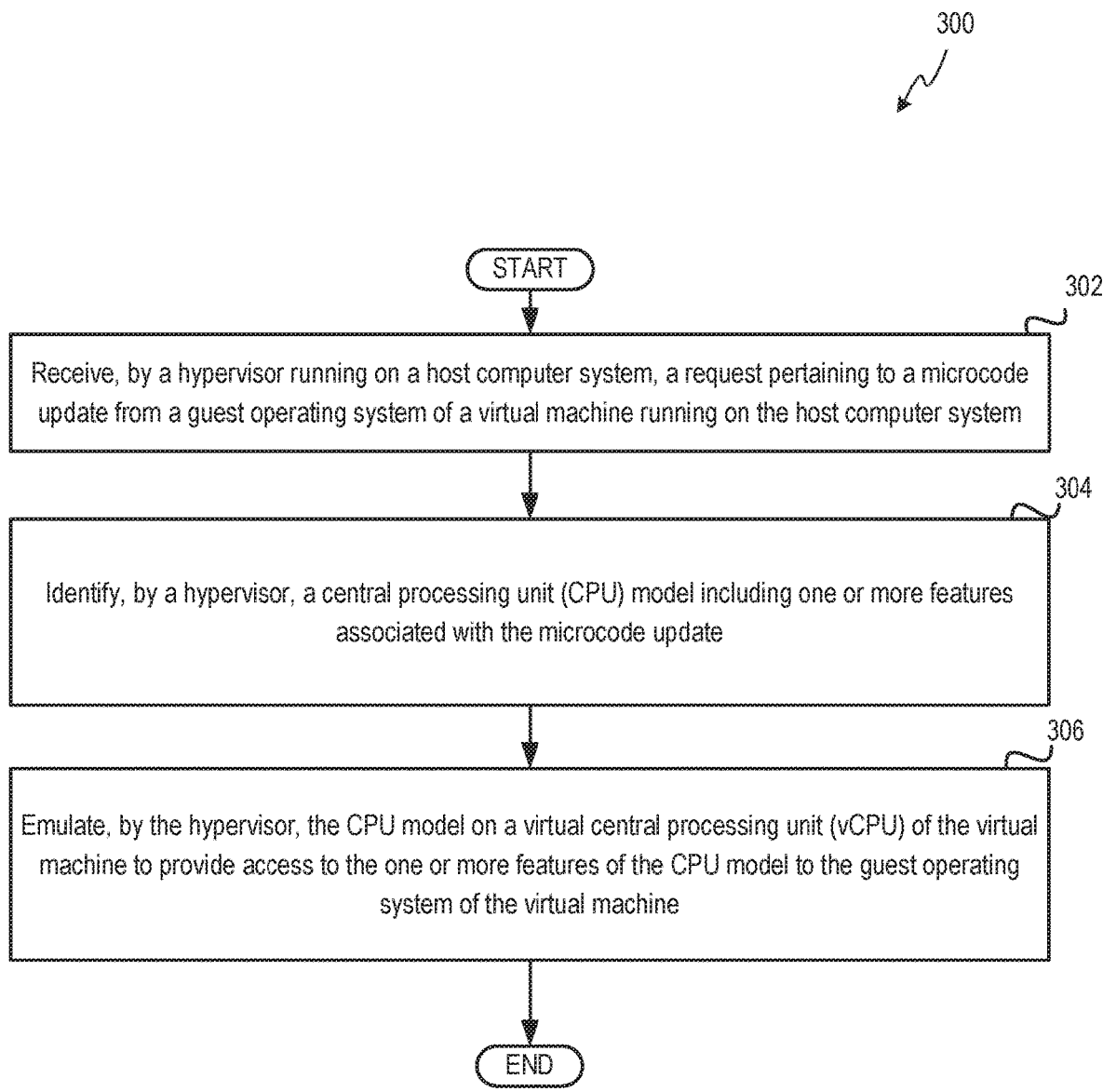
FIG. 3 depicts a flow diagram of an example method for a hypervisor emulating a central processing unit model based on a request pertaining to a microcode update received from a guest operating system, in accordance with one or more aspects of the present disclosure.

FIG. 3 depicts a flow diagram of an example method 300 for a hypervisor emulating a central processing unit model based on a request pertaining to a microcode update received from a guest operating system, in accordance with one or more aspects of the present disclosure. Method 300 and each of its individual functions, routines, subroutines, or operations may be performed by one or more processing devices of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by one or more processing devices of the host computer system 120A executing the hypervisor 120A.

Method 300 may begin at block 302. At block 302, a processing device executing the hypervisor running on the host computer system receives a request pertaining to a microcode update from a guest operating system of a virtual machine running on the host computer system. In some embodiments, the request pertaining to the microcode update from the guest operating system may be received in response to the guest operating system receiving an indication of the microcode update from a channel to which the guest operating system is subscribed. The request pertaining to the microcode update may include a microcode update blob.

In some embodiments, prior to receiving the request pertaining to the microcode update from the guest operating system, the processing device may receive another request pertaining to the microcode update from the virtualization manager. The another request may specify adding an entry to the hypervisor data store and the another request may identify the microcode update and the CPU model including the one or more features associated with the microcode update. The processing device may add, to the hypervisor data store, an entry including the identifier of the microcode update and the identifier of the CPU model for the microcode update.

At block 304, the processing device executing the hypervisor identifies a CPU model including one or more features associated with the microcode update. In some embodiments, identifying the CPU model may include determining an identifier of the microcode update based on the request. For example, the request may include the microcode update blob and the processing device may perform a hash function on the microcode update blob to determine the identifier of the microcode update. The processing device may search the hypervisor data store for an entry including the identifier of the microcode update. The hypervisor data store may include numerous entries, and each entry may include a respective identifier of a respective microcode update, an identifier of a CPU model including one or more features associated with the respective microcode update, and an active flag.

In response to locating the entry including the identifier of the microcode update, the processing device may modify the active flag of the entry to indicate the entry is active. The processing device may also modify the active flag of another entry to inactive that was set to active prior to the request being received. If the entry including the identifier of the microcode update is not found, the processing device may reject the request and may continue to emulate a CPU model currently being emulated on the vCPU.

At block 306, the processing device executing the hypervisor emulates the CPU model on a vCPU of the virtual machine to provide access to the one or more features of the CPU model to the guest operating system of the virtual machine. In some embodiments, emulating the CPU model on the vCPU may include emulating the CPU model on the vCPU while the virtual machine associated with the vCPU is running. Thus, the hypervisor modifies one or more features provided by the vCPU during runtime of the virtual machine to reduce virtual machine downtime.

Additionally, in some embodiments, a live migration of the virtual machine may be performed. A live migration may refer to moving the virtual machine from one host computer system to another host computer system while the virtual machine remains running. In some embodiments, using the techniques disclosed herein, the microcode update may be emulated on the vCPU of the virtual machine during the live migration such that the features provided by the vCPU of the virtual machine on a destination host computer system are different than the features provided by the vCPU of the virtual when it was located on a source host computer system.

In some embodiments, the processing device may receive, from the virtualization manager, a request pertaining to which entry in the hypervisor data store that is storing numerous identifiers of microcode updates and corresponding identifiers of CPU models includes an active flag set to active. The processing device may search the hypervisor data store for an entry including an active flag set to active. In response to locating the entry in the data store that includes the flag set to active, the processing device may send at least one of an identifier of a microcode update or an identifier of a CPU model associated with the entry that includes the flag set to active to the virtualization manager.

Figure 4:
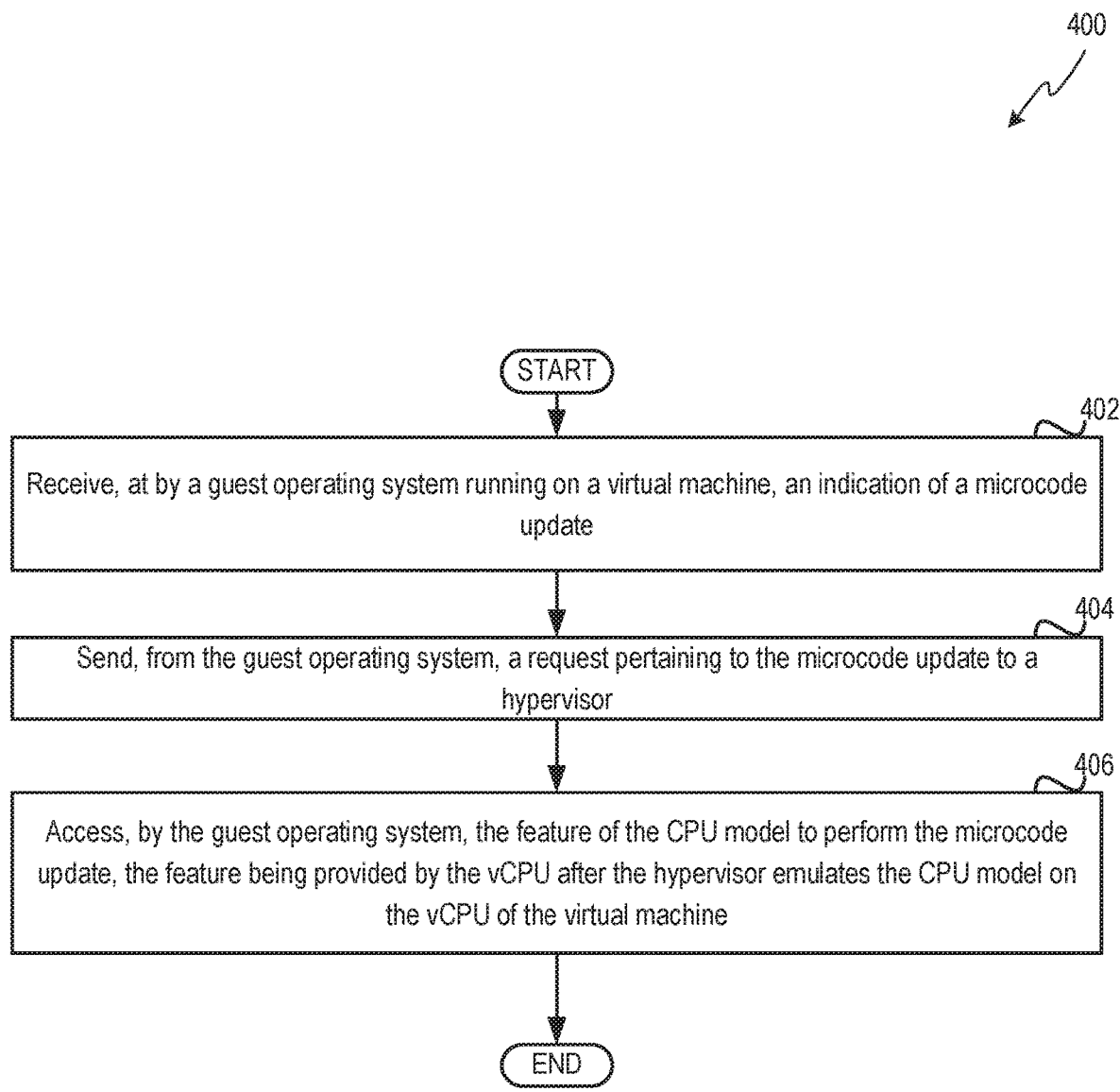
FIG. 4 depicts a flow diagram of an example method for a virtual machine sending a request pertaining to a microcode update and accessing a feature of a CPU model to perform the microcode update, in accordance with one or more aspects of the present disclosure.

FIG. 4 depicts a flow diagram of an example method 400 for a virtual machine sending a request pertaining to a microcode update and accessing a feature of a CPU model to perform the microcode update, in accordance with one or more aspects of the present disclosure. Method 400 includes operations performed by the host computer system 120A. Also, method 400 may be performed in the same or a similar manner as described above in regards to method 300. Method 400 may be performed by processing devices of the source host 120A executing the virtual machine 122A.

Method 400 may begin at block 402. At block 402, a processing device executing the virtual machine receives, by a guest operating system running on the virtual machine, an indication of a microcode update. The indication may be received via a channel of an update server that the guest operating system is subscribed to. The indication of the microcode update may be received when the administrator of the virtual machine downloads the microcode update from the update server. The update server may be associated with a software vendor of the guest operating system running on the virtual machine or the processor vendor that produces the processor being emulated on the vCPU.

At block 404, the processing device sends, from the guest operating system, a request pertaining to the microcode update to a hypervisor. The request may be for the hypervisor to emulate the microcode update on a vCPU of the virtual machine. The request may include an identifier of the microcode update that is determined by the hypervisor by performing a hash function on a microcode update blob included in the request. The identifier of the microcode update may be associated with a feature of a CPU model to be emulated by the hypervisor on a vCPU of the virtual machine while the virtual machine remains running.

At block 406, the processing device accesses, by the guest operating system, the feature of the CPU model to perform the microcode update. The feature may be provided by the vCPU after the hypervisor emulates the CPU model on the vCPU of the virtual machine. The processing device may access the feature by the guest operating system executing an instruction to obtain information pertaining to the feature of the CPU model that is being emulated on the vCPU. The processing device may modify a guest data store of the guest operating system in guest memory with the information pertaining to the feature of the CPU model. The data store may indicate which features of the CPU model are available to be accessed by the guest operating system. Even though the features associated with the CPU model being emulated may be different than features of the previous CPU model being emulated, the guest operating system may continue to operate because the feature change is expected by the guest operating system after requesting a microcode update.

Figure 5:
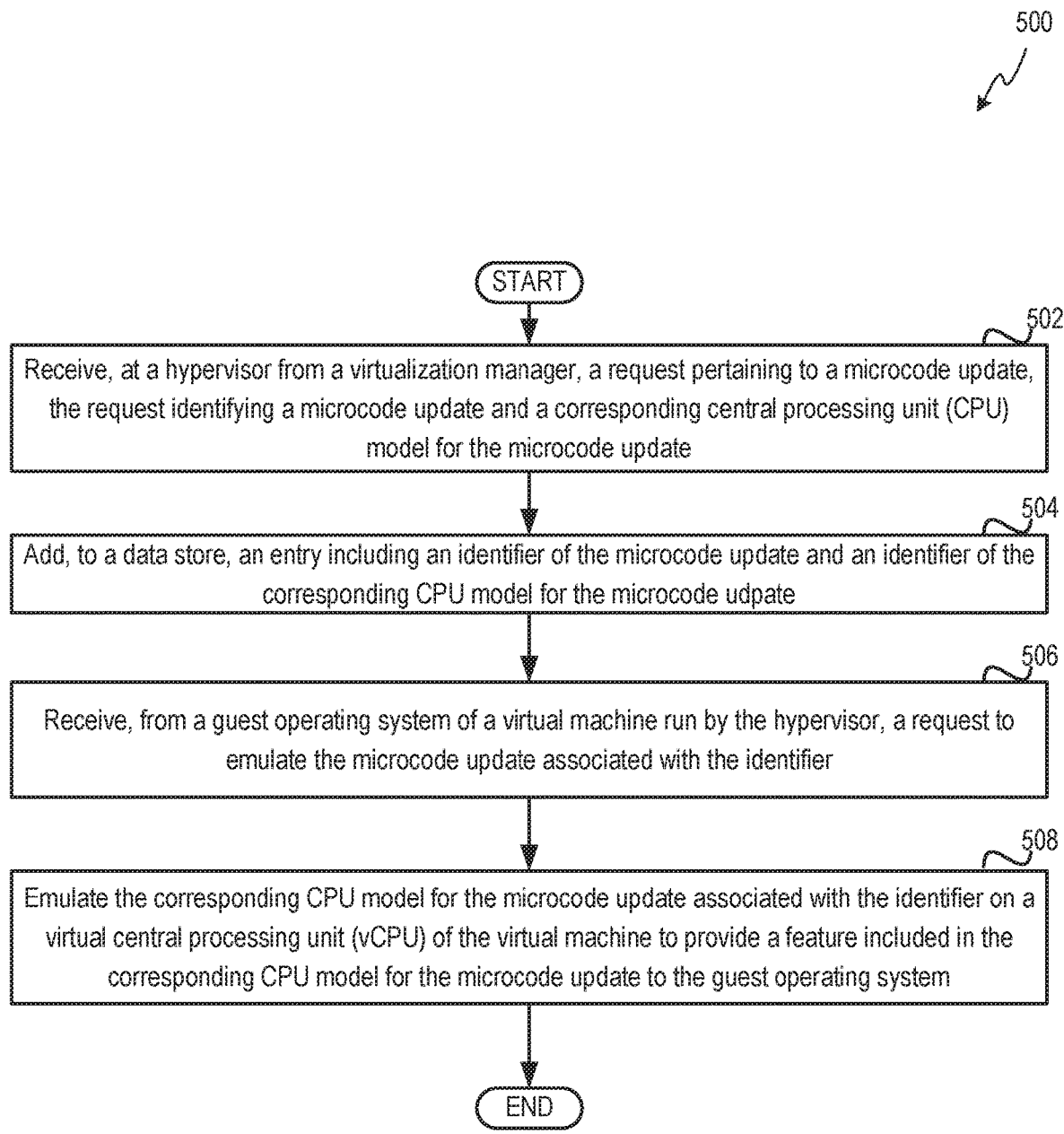
FIG. 5 depicts a flow diagram of an example method for a hypervisor updating a hypervisor data store with information pertaining to a microcode update, in accordance with one or more aspects of the present disclosure.

FIG. 5 depicts a flow diagram of an example method 500 for a hypervisor updating a hypervisor data store with information pertaining to a microcode update, in accordance with one or more aspects of the present disclosure. Method 500 includes operations performed by the host computer system 120A. Also, method 500 may be performed in the same or a similar manner as described above in regards to method 300. Method 500 may be performed by processing devices of the source host 120A executing the hypervisor 120A.

Method 500 may begin at block 502. At block 502, a processing device executing a hypervisor receives a request from a virtualization manager. The request may be sent from the virtualization manager (e.g., via an application programming interface) in response to receiving an indication of a microcode update from the update server, for example. In some embodiments, an administrator of the virtualization manager may have caused the request to be sent. The request pertains to a microcode update. The request may specify adding, removing, or updating an entry to the hypervisor data store. The request may include a microcode update blob and may identify a microcode update and a corresponding CPU model for the microcode update. The processing device may determine an identifier of the microcode update by performing a hash function using the microcode update blob. Further, the request may include an identifier of the CPU model and the one or more features associated with the CPU model.

At block 504, the processing device may add, to the hypervisor data store, an entry including the identifier of the microcode update and the identifier of the corresponding CPU model for the microcode update. The processing device may set an active flag for the new entry to inactive when the entry is added. In some embodiments, the processing device may add an entry to another hypervisor data store that maps the identifier of the CPU model to the one or more features of the CPU model. The another hypervisor data store may also be stored in guest memory.

At block 506, the processing device may receive, from the guest operating system of the virtual machine run by the hypervisor, a request to emulate the microcode update associated with the identifier. The request may include the microcode update blob that the guest operating system of the virtual machine receives in an indication of the microcode update from an update server, for example. In some embodiments, the administrator of the virtual machine may have caused the microcode update blob to be downloaded from the update server. The hypervisor may determine an identifier for the microcode update by performing a hash function on the microcode update blob. In some embodiments, the processing device may search the hypervisor data store for an entry including the identifier of the microcode update. The hypervisor data store may include numerous entries each having a respective microcode update identifier field, a CPU model identifier field, and an active flag field. In response to locating the entry including the identifier of the microcode update being searched for, the processing device may modify the active flag of the entry to indicate the entry is active.

At block 508, the processing device may emulate the corresponding CPU model for the microcode update associated with the identifier on a vCPU of the virtual machine to provide a feature included in the corresponding CPU model for the microcode update to the guest operating system. The processing device may emulate the corresponding CPU model for the microcode update associated with the identifier on the vCPU while the virtual machine remains running.

In some embodiments, the processing device is to receive, at the hypervisor from the virtualization manager, a request pertaining to which entry in the hypervisor data store includes an active flag set to active. In response to locating the entry in the data store that includes the active flag set to active, the processing device may send at least one of an identifier of a microcode update or an identifier of a CPU model associated with the entry that includes the flag set to active to the virtualization manager. The virtualization manager may send a notification to a client device of the administrator of the virtual machine when it is determined that a more current microcode update than the one requested by the guest operating system is already being emulated on the vCPU.

Figure 6:
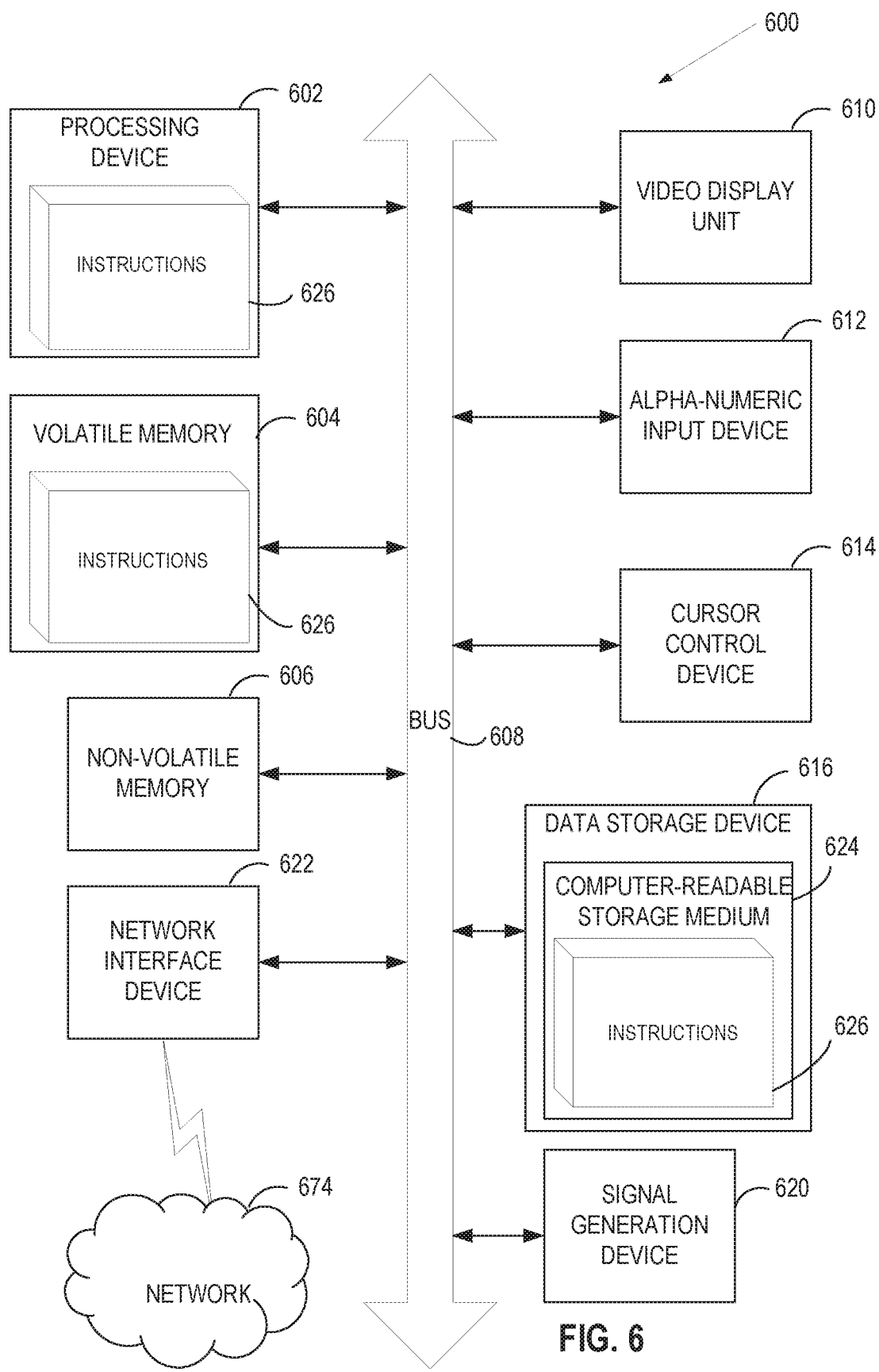
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to a computing device within system architecture 100 of FIG. 1. In one implementation, the computer system 600 may be the host computer systems 120A-120N. In another implementation, the computer system 600 may be hosting the virtualization manager 110. In another implementation, the computer system 600 may be the client device 130 or the update server 135. The computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions implementing the hypervisor 122A-122N of FIG. 1 for implementing methods 300 and 500 and/or the virtual machine 124A-124N of FIG. 1 for implementing method 400.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 400, and 500, and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Other computer system designs and configurations may also be suitable to implement the systems and methods described herein. The following examples illustrate various implementations in accordance with one or more aspects of the present disclosure.

Example 1 is a method, comprising: receiving, by a hypervisor running on a host computer system, a request pertaining to a microcode update from a guest operating system of a virtual machine running on the host computer system; identifying, by a hypervisor, a central processing unit (CPU) model comprising one or more features associated with the microcode update; and emulating, by the hypervisor, the CPU model on a virtual central processing unit (vCPU) of the virtual machine to provide access to the one or more features of the CPU model to the guest operating system of the virtual machine.

Example 2 is the method of Example 1, wherein emulating the CPU model on the vCPU further comprises emulating the CPU model on the vCPU while the virtual machine is running.

Example 3 is the method of Example 1, wherein identifying the CPU model comprising the one or more features associated with the microcode update further comprises: determining an identifier of the microcode update based on the request; and searching a data store for an entry including the identifier of the microcode update, wherein the data store comprises a plurality of entries, and each of the plurality of entries comprises a respective identifier of a respective microcode update, an identifier of a CPU model comprising one or more features associated with the respective microcode update, and an active flag.

Example 4 is the method of Example 3, further comprising: in response to locating the entry including the identifier of the microcode update, modifying the active flag of the entry to indicate the entry is active.

Example 5 is the method of Example 1, further comprising, prior to receiving the request pertaining to the microcode update from the guest operating system: receiving, by the hypervisor, another request pertaining to the microcode update from a virtualization manager, the another request identifying the microcode update and the CPU model comprising the one or more features associated with the microcode update; add, to a data store, an entry comprising an identifier of the microcode update and an identifier of the CPU model for the microcode update.

Example 6 is the method of Example 1, further comprising: receiving, by the hypervisor from a virtualization manager, a request pertaining to which entry in a data store storing a plurality of identifiers of microcode updates and corresponding identifiers of CPU models includes an active flag set to active; in response to locating the entry in the data store that includes the active flag set to active, sending at least one of an identifier of a microcode update or an identifier of a CPU model associated with the entry that includes the active flag set to active to the virtualization manager.

Example 7 is the method of Example 1, wherein the request pertaining to the microcode update from the guest operating system is received in response to the guest operating system receiving an indication of the microcode update from a channel to which the guest operating system is subscribed.

Example 8 is the method of Example 1, wherein the request pertaining to the microcode update from the guest operating system comprises a microcode update blob and the method further comprises determining an identifier of the microcode update by performing a hash function using the microcode update blob.

Example 9 is a tangible, non-transitory computer-readable medium storing instructions that, when executed, cause a processing device to: receive, by a guest operating system running on a virtual machine, an indication of a microcode update; send, from the guest operating system, a request pertaining to the microcode update to a hypervisor, wherein the request comprises an identifier of the microcode update, the identifier of the microcode update being associated with a feature of a central processing unit (CPU) model to be emulated by the hypervisor on a virtual central processing unit (vCPU) of the virtual machine; and access, by the guest operating system, the feature of the CPU model to perform the microcode update, the feature being provided by the vCPU after the hypervisor emulates the CPU model on the vCPU of the virtual machine.

Example 10 is the non-transitory computer-readable medium of Example 9, wherein the CPU model is to be emulated by the hypervisor on the vCPU of the virtual machine while the virtual machine remains running.

Example 11 is the non-transitory computer-readable medium of Example 9, wherein the processing device is further to execute an instruction to obtain information pertaining to the feature of the CPU model that is being emulated on the vCPU.

Example 12 is the non-transitory computer-readable medium of Example 11, wherein the processing device is further to modify a data store of the guest operating system in guest memory with the information pertaining to the feature of the CPU model, wherein the data store indicates which features of the CPU model are available to be accessed.

Example 13 is the non-transitory computer-readable medium of Example 9, wherein the request pertaining to the microcode update comprises a microcode update blob that the hypervisor uses in a hash function to determine an identifier of the microcode update.

Example 14 is the non-transitory computer-readable medium of Example 9, wherein the indication of the microcode update is received from a channel subscribed to by the guest operating system.

Example 15 is a system, comprising: a memory device; and a processing device coupled to the memory device, the processing device to: receive, at a hypervisor from a virtualization manager, a request pertaining to a microcode update, the request identifying a microcode update and a corresponding central processing unit (CPU) model for the microcode update; add, to a data store, an entry comprising an identifier of the microcode update and an identifier of the corresponding CPU model for the microcode update; receive, from a guest operating system of a virtual machine run by the hypervisor, a request to emulate the microcode update associated with the identifier; and emulate the corresponding CPU model for the microcode update associated with the identifier on a virtual central processing unit (vCPU) of the virtual machine to provide a feature included in the corresponding CPU model for the microcode update to the guest operating system.

Example 16 is the system of Example 15, wherein the processing device is further to emulate the corresponding CPU model for the microcode update associated with the identifier on the virtual vCPU of the virtual machine while the virtual machine remains running.

Example 17 is the system of Example 15, wherein the request to emulate the microcode update comprises a microcode update blob and the processing device is further to use a hash function with the microcode update blob to determine the identifier.

Example 18 is the system of Example 15, wherein the processing device is further to: search a data store for an entry including the identifier of the microcode update, wherein the data store comprises a plurality of entries, and each of the plurality of entries comprises a respective identifier of a respective microcode update, an identifier of a CPU model comprising one or more features associated with the respective microcode update, and an active flag.

Example 19 is the system of Example 18, wherein the processing device is further to, in response to locating the entry including the identifier of the microcode update, modify the active flag of the entry to indicate the entry is active.

Example 20 is the system of Example 15, wherein the processing device is further to: receive, at the hypervisor from the virtualization manager, a request pertaining to which entry in a data store includes an active flag set to active, wherein the data store stores a plurality of identifiers of microcode updates and corresponding identifiers of CPU models; in response to locating the entry in the data store that includes the active flag set to active, send at least one of an identifier of a microcode update or an identifier of a CPU model associated with the entry that includes the active flag set to active to the virtualization manager.

Example 21 is a method comprising: receiving, by a guest operating system running on a virtual machine, an indication of a microcode update; sending, from the guest operating system, a request pertaining to the microcode update to a hypervisor, wherein the request comprises an identifier of the microcode update, the identifier of the microcode update being associated with a feature of a central processing unit (CPU) model to be emulated by the hypervisor on a virtual central processing unit (vCPU) of the virtual machine; and accessing, by the guest operating system, the feature of the CPU model to perform the microcode update, the feature being provided by the vCPU after the hypervisor emulates the CPU model on the vCPU of the virtual machine.

Example 22 is the method of Example 21, wherein the CPU model is to be emulated by the hypervisor on the vCPU of the virtual machine while the virtual machine remains running.

Example 23 is the method of Example 21, further comprising executing an instruction to obtain information pertaining to the feature of the CPU model that is being emulated on the vCPU.

Example 24 is the method of Example 23, further comprising modifying a data structure of the guest operating system in guest memory with the information pertaining to the feature of the CPU model, wherein the data structure indicates which features of the CPU model are available to be accessed.

Example 25 is the method of Example 21, wherein the request pertaining to the microcode update comprises a microcode update blob that the hypervisor uses in a hash function to determine an identifier of the microcode update.

Example 26 is the method of Example 21, wherein the indication of the microcode update is received from a channel subscribed to by the guest operating system.

Example 27 is an apparatus comprising: a means for receiving, by a hypervisor running on a host computer system, a request pertaining to a microcode update from a guest operating system of a virtual machine running on the host computer system; a means for identifying, by a hypervisor, a central processing unit (CPU) model comprising one or more features associated with the microcode update; and a means for emulating, by the hypervisor, the CPU model on a virtual central processing unit (vCPU) of the virtual machine to provide access to the one or more features of the CPU model to the guest operating system of the virtual machine.

Example 28 is the apparatus of Example 27, wherein emulating the CPU model on the vCPU further comprises emulating the CPU model on the vCPU while the virtual machine is running.

Example 29 is the apparatus of Example 1, wherein identifying the central processing unit (CPU) model comprising the one or more features associated with the microcode update further comprises: a means for determining an identifier of the microcode update based on the request; and a means for searching a data store for an entry including the identifier of the microcode update, wherein the data store comprises a plurality of entries, and each of the plurality of entries comprises a respective identifier of a respective microcode update, an identifier of a CPU model comprising one or more features associated with the respective microcode update, and an active flag.

Example 30 is the apparatus of Example 29, further comprising: in response to locating the entry including the identifier of the microcode update, a means for modifying the active flag of the entry to indicate the entry is active.

Example 31 is the apparatus of Example 29, further comprising, prior to receiving the request pertaining to the microcode update from the guest operating system: a means for receiving, by the hypervisor, another request pertaining to the microcode update from a virtualization manager, the another request identifying the microcode update and the CPU model comprising the one or more features associated with the microcode update; a means for adding, to a data store, an entry comprising an identifier of the microcode update and an identifier of the CPU model for the microcode update.

Example 32 is the apparatus of Example 29, further comprising: a means for receiving, by the hypervisor from a virtualization manager, a request pertaining to which entry in a data store storing a plurality of identifiers of microcode updates and corresponding identifiers of CPU models includes an active flag set to active; in response to locating the entry in the data store that includes the active flag set to active, a means for sending at least one of an identifier of a microcode update or an identifier of a CPU model associated with the entry that includes the active flag set to active to the virtualization manager.

Example 33 is the apparatus of Example 29, wherein the request pertaining to the microcode update from the guest operating system is received in response to the guest operating system receiving an indication of the microcode update from a channel to which the guest operating system is subscribed.

Example 34 is the apparatus of Example 29, wherein the request pertaining to the microcode update from the guest operating system comprises a microcode update blob the method further comprises a means for determining an identifier of the microcode update by performing has function using the microcode update blob.

What is claimed is:

1. A method, comprising:
   receiving, by a hypervisor running on a host computer system, a request pertaining to a microcode update from a guest operating system of a virtual machine running on the host computer system;
   identifying, by the hypervisor, a central processing unit (CPU) model comprising one or more features associated with the microcode update; and
   emulating, by the hypervisor, the CPU model on a virtual central processing unit (vCPU) of the virtual machine to provide access to the one or more features of the CPU model to the guest operating system of the virtual machine.

2. The method of claim 1, wherein emulating the CPU model on the vCPU further comprises emulating the CPU model on the vCPU while the virtual machine is running.

3. The method of claim 1, wherein identifying the CPU model comprising the one or more features associated with the microcode update further comprises:
   determining an identifier of the microcode update based on the request; and
   searching a data store for an entry including the identifier of the microcode update, wherein the data store comprises a plurality of entries, and each of the plurality of entries comprises a respective identifier of a respective microcode update, an identifier of a CPU model comprising one or more features associated with the respective microcode update, and an active flag.

4. The method of claim 3, further comprising:
   in response to locating the entry including the identifier of the microcode update, modifying the active flag of the entry to indicate the entry is active.

5. The method of claim 1, further comprising, prior to receiving the request pertaining to the microcode update from the guest operating system:
   receiving, by the hypervisor, another request pertaining to the microcode update from a virtualization manager, the another request identifying the microcode update and the CPU model comprising the one or more features associated with the microcode update;
   add, to a data store, an entry comprising an identifier of the microcode update and an identifier of the CPU model for the microcode update.

6. The method of claim 1, further comprising:
   receiving, by the hypervisor from a virtualization manager, a request pertaining to which entry in a data store storing a plurality of identifiers of microcode updates and corresponding identifiers of CPU models includes an active flag set to active;
   in response to locating the entry in the data store that includes the active flag set to active, sending at least one of an identifier of a microcode update or an identifier of a CPU model associated with the entry that includes the active flag set to active to the virtualization manager.

7. The method of claim 1, wherein the request pertaining to the microcode update from the guest operating system is received in response to the guest operating system receiving an indication of the microcode update from a channel to which the guest operating system is subscribed.

8. The method of claim 1, wherein the request pertaining to the microcode update from the guest operating system comprises a microcode update blob and the method further comprises determining an identifier of the microcode update by performing a hash function using the microcode update blob.

9. A tangible, non-transitory computer-readable medium storing instructions that, when executed, cause a processing device to:

receive, by a guest operating system running on a virtual machine, an indication of a microcode update;

send, from the guest operating system, a request pertaining to the microcode update to a hypervisor, wherein the request comprises an identifier of the microcode update, the identifier of the microcode update being associated with a feature of a central processing unit (CPU) model to be emulated by the hypervisor on a virtual central processing unit (vCPU) of the virtual machine; and access, by the guest operating system, the feature of the CPU model to perform the microcode update, the feature being provided by the vCPU after the hypervisor emulates the CPU model on the vCPU of the virtual machine.

10. The non-transitory computer-readable medium of claim 9, wherein the CPU model is to be emulated by the hypervisor on the vCPU of the virtual machine while the virtual machine remains running.

11. The non-transitory computer-readable medium of claim 9, wherein the processing device is further to execute an instruction to obtain information pertaining to the feature of the CPU model that is being emulated on the vCPU.

12. The non-transitory computer-readable medium of claim 11, wherein the processing device is further to modify a data store of the guest operating system in guest memory with the information pertaining to the feature of the CPU model, wherein the data store indicates which features of the CPU model are available to be accessed.

13. The non-transitory computer-readable medium of claim 9, wherein the request pertaining to the microcode update comprises a microcode update blob that the hypervisor uses in a hash function to determine an identifier of the microcode update.

14. The non-transitory computer-readable medium of claim 9, wherein the indication of the microcode update is received from a channel subscribed to by the guest operating system.

15. A system, comprising:
a memory device; and
a processing device coupled to the memory device, the processing device to:
receive, at a hypervisor from a virtualization manager, a request pertaining to a microcode update, the request identifying the microcode update and a corresponding central processing unit (CPU) model for the microcode update;
add, to a data store, an entry comprising an identifier of the microcode update and an identifier of the corresponding CPU model for the microcode update;
receive, from a guest operating system of a virtual machine run by the hypervisor, a request to emulate the microcode update associated with the identifier; and
emulate the corresponding CPU model for the microcode update associated with the identifier on a virtual central processing unit (vCPU) of the virtual machine to provide a feature included in the corresponding CPU model for the microcode update to the guest operating system.

16. The system of claim 15, wherein the processing device is further to emulate the corresponding CPU model for the microcode update associated with the identifier on the virtual vCPU of the virtual machine while the virtual machine remains running.

17. The system of claim 15, wherein the request to emulate the microcode update comprises a microcode update blob and the processing device is further to use a hash function with the microcode update blob to determine the identifier.

18. The system of claim 15, wherein the processing device is further to:
search a data store for an entry including the identifier of the microcode update, wherein the data store comprises a plurality of entries, and each of the plurality of entries comprises a respective identifier of a respective microcode update, an identifier of a CPU model comprising one or more features associated with the respective microcode update, and an active flag.

19. The system of claim 18, wherein the processing device is further to, in response to locating the entry including the identifier of the microcode update, modify the active flag of the entry to indicate the entry is active.

20. The system of claim 15, wherein the processing device is further to:
receive, at the hypervisor from the virtualization manager, a request pertaining to which entry in a data store includes an active flag set to active, wherein the data store stores a plurality of identifiers of microcode updates and corresponding identifiers of CPU models;
in response to locating the entry in the data store that includes the active flag set to active, send at least one of an identifier of a microcode update or an identifier of a CPU model associated with the entry that includes the active flag set to active to the virtualization manager.

* * * * *